(12) United States Patent  (10) Patent No.: US 9,088,176 B2
Hendin et al.  (45) Date of Patent: Jul. 21, 2015

(54) POWER MANAGEMENT EFFICIENCY USING DC-DC AND LINEAR REGULATORS IN CONJUNCTION

(75) Inventors: Neil Hendin, Mountain View, CA (US); Zahid Najam, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1000 days.

(21) Appl. No.: 12/002,651

(22) Filed: Dec. 17, 2007

(65) Prior Publication Data

US 2009/0153108 A1  Jun. 18, 2009

(51) Int. Cl.
*G05F 1/00*  (2006.01)
*H02J 1/08*  (2006.01)
*H02M 3/28*  (2006.01)
*H02M 1/00*  (2007.01)

(52) U.S. Cl.
CPC .. *H02J 1/08* (2013.01); *H02M 3/28* (2013.01); *H02M 2001/008* (2013.01); *H02M 2001/0045* (2013.01)

(58) Field of Classification Search
USPC .......................... 323/234, 267–270, 273–281
See application file for complete search history.

(56) References Cited

U.S. PATENT DOCUMENTS

| | | |
|---|---|---|
| 4,631,532 A | 12/1986 | Grothe |
| 4,868,832 A | 9/1989 | Marrington et al. |
| 5,109,494 A | 4/1992 | Ehlig et al. |
| 5,142,690 A | 8/1992 | McMullan, Jr. et al. |
| 5,220,660 A | 6/1993 | Yoshizawa et al. |
| 5,230,067 A | 7/1993 | Buch |
| 5,274,828 A | 12/1993 | McAdams |
| 5,282,034 A | 1/1994 | Elkind et al. |
| 5,305,443 A | 4/1994 | Franzo |
| 5,339,445 A | 8/1994 | Gasztonyi |
| 5,386,552 A | 1/1995 | Garney |
| 5,388,265 A | 2/1995 | Volk |
| 5,396,635 A | 3/1995 | Fung |
| 5,402,492 A | 3/1995 | Goodman et al. |
| 5,408,668 A | 4/1995 | Tornai |
| 5,446,904 A | 8/1995 | Belt et al. |
| 5,471,189 A | 11/1995 | Dietz et al. |
| 5,475,402 A | 12/1995 | Hijikata |
| 5,510,740 A | 4/1996 | Farrell et al. |
| 5,517,441 A | 5/1996 | Dietz et al. |

(Continued)

OTHER PUBLICATIONS

Wikipedia, Definition of "Blanking", <http://en.wikipedia.org/wiki/Blanking_(video)>, accessed on Aug. 12, 2010.

*Primary Examiner* — Jeffrey Gblende

(57) ABSTRACT

A power management unit for improving power efficiency of an electronic device. The power management unit includes a first and a second stage power regulator and a control circuitry. The first stage power regulator includes a switching regulator to efficiently adjust an input voltage based on a feedback signal. The adjusted input voltage provides the second stage power regulator that includes low dropout voltage regulators with an input voltage close to its output. Thus, power dissipation in the second stage is reduced by reducing the voltage differential between the input and desired output voltages. The second stage turns on/off power to units of the electronic device. The control circuitry generates the feedback signal based on dropout voltages of the low dropout voltages, the desired output voltage and the adjusted input voltage. The largest dropout voltage is selected and adds it to the desired output voltage to generate the feedback signal.

23 Claims, 6 Drawing Sheets

(56) References Cited

U.S. PATENT DOCUMENTS

| | | |
|---|---|---|
| 5,524,249 A | 6/1996 | Suboh |
| 5,528,610 A | 6/1996 | Edler et al. |
| 5,530,845 A | 6/1996 | Hiatt et al. |
| 5,535,398 A | 7/1996 | Biggs et al. |
| 5,537,650 A | 7/1996 | West et al. |
| 5,557,777 A | 9/1996 | Culbert |
| 5,586,308 A | 12/1996 | Hawkins et al. |
| 5,588,099 A | 12/1996 | Mogilevsky et al. |
| 5,594,367 A | 1/1997 | Trimberger et al. |
| 5,594,874 A | 1/1997 | Narayanan et al. |
| 5,615,376 A | 3/1997 | Ranganathan |
| 5,644,325 A | 7/1997 | King et al. |
| 5,649,222 A | 7/1997 | Mogilevsky |
| 5,659,687 A | 8/1997 | Kim et al. |
| 5,687,382 A | 11/1997 | Kojima et al. |
| 5,737,613 A | 4/1998 | Mensch, Jr. |
| 5,752,050 A | 5/1998 | Hernandez et al. |
| 5,758,133 A | 5/1998 | Evoy |
| 5,790,877 A | 8/1998 | Nishiyama et al. |
| 5,862,368 A | 1/1999 | Miller et al. |
| 5,869,979 A | 2/1999 | Bocchino |
| 5,898,879 A | 4/1999 | Kim |
| 5,951,689 A | 9/1999 | Evoy et al. |
| 5,963,219 A | 10/1999 | Choi |
| 6,029,170 A | 2/2000 | Garger et al. |
| 6,031,362 A * | 2/2000 | Bradley .................. 323/269 |
| 6,034,544 A | 3/2000 | Agrawal et al. |
| 6,040,845 A | 3/2000 | Melo et al. |
| 6,057,705 A | 5/2000 | Wojewoda et al. |
| 6,061,679 A | 5/2000 | Bournas et al. |
| 6,134,167 A | 10/2000 | Atkinson |
| 6,163,583 A | 12/2000 | Lin et al. |
| 6,169,546 B1 | 1/2001 | Bogdan |
| 6,169,984 B1 | 1/2001 | Bogdan |
| 6,178,523 B1 | 1/2001 | Klein |
| 6,191,969 B1 | 2/2001 | Pereira |
| 6,191,970 B1 | 2/2001 | Pereira |
| 6,212,645 B1 | 4/2001 | Tjandrasuwita |
| 6,216,234 B1 | 4/2001 | Sager et al. |
| 6,243,280 B1 | 6/2001 | Wong et al. |
| 6,249,284 B1 | 6/2001 | Bogdan |
| 6,266,776 B1 | 7/2001 | Sakai |
| 6,347,370 B1 | 2/2002 | Grimsrud |
| 6,397,340 B2 | 5/2002 | Watts, Jr. et al. |
| 6,411,330 B1 | 6/2002 | Purcell et al. |
| 6,438,005 B1 * | 8/2002 | Walter .................. 363/60 |
| 6,523,128 B1 | 2/2003 | Stapleton et al. |
| 6,538,947 B2 | 3/2003 | Ahmed et al. |
| 6,940,440 B1 | 9/2005 | Iacob |
| 7,402,986 B2 * | 7/2008 | Frith et al. .................. 323/282 |
| 8,327,173 B2 | 12/2012 | Hendin et al. |
| 2004/0051389 A1 * | 3/2004 | Verbist et al. .................. 307/80 |
| 2004/0145358 A1 * | 7/2004 | Rogers .................. 323/267 |
| 2006/0123254 A1 * | 6/2006 | Lim et al. .................. 713/300 |
| 2007/0200539 A1 * | 8/2007 | Ganti et al. .................. 323/282 |
| 2007/0200542 A1 * | 8/2007 | Lee et al. .................. 323/304 |
| 2008/0067995 A1 * | 3/2008 | Chua-Eoan et al. .......... 323/284 |
| 2008/0076484 A1 * | 3/2008 | Veselic .................. 455/572 |
| 2009/0158066 A1 | 6/2009 | Steinbusch et al. |
| 2009/0224866 A1 | 9/2009 | Glen et al. |

\* cited by examiner

POWER MANAGEMENT EFFICIENCY USING DC-DC AND LINEAR REGULATORS IN CONJUNCTION

TECHNICAL FIELD

The embodiments of the present invention relate to the field of power management in electronic devices. More particularly, embodiments of the present invention relate to a method and system for improving the efficiency of a power management unit in an electronic device using DC-DC and linear regulators.

BACKGROUND ART

Use of various electronic devices has increased substantially in recent years. For example, use of laptops, mobile telephones, Blackberrys, pagers, IPods, etc. have become common in public places such as coffee shops, restaurants, college campuses, businesses, etc.

Users demand their electronic devices to be integrated such that one electronic device provides various functionalities. For example, most mobile devices (e.g., iPhone, Blackberry, Treo, etc.) can now be operated as a computer, a music player, a game console, a telephone, etc. This extends the typical use duration and increases the power demand of the device between recharge cycles. Unfortunately, increase in the device functionality increases the power demand, thereby increasing the frequency by which the device needs to be recharged by the user.

Batteries are used to provide mobility to electronic devices. Unfortunately functionalities places a drain on battery power. Accordingly, in order to save batter power and increase battery life, devices selectively turn on/off various intra sub-units in response to user demand. Various power management methods have been developed in order to selectively turn on/off various units in order to conserver battery power. For example, a power management unit may be used to shutdown power to a display, WIFI, etc. when the mobile device is used as a music player, e.g., an MP3 player, in order to conserve power. In general each of the powered sub-units in an electronic device is powered by its own power regulator to allow each sub-unit to be controlled independently.

Conventionally, two methods are used in power management units. The first method uses linear regulators. The second method uses switching regulators.

Linear regulators are in general small and use few external components. Unfortunately, linear regulators become very inefficient when the difference between their input and output voltage increases because linear regulators regulate the input and output voltage by internally dissipating power. For example, more power is dissipated when the difference between the input voltage and the output voltage is 2 volts in comparison to when the difference between the input voltage and the output voltage is 0.5 volt. As a result, the greater the difference between the input and output voltage, the greater the power dissipation becomes, thus the greater the inefficiency becomes.

In contrast, switching regulators are more efficient than linear regulators because they do not internally dissipate power like linear regulators. Switching regulators regulate the input and output power by storing energy electro-magnetically and releasing it as output voltage on demand. Unfortunately, switching regulators are in general larger, more complex and more expensive to implement in comparison to linear regulators. Moreover, switching regulators use more external components in comparison to linear regulators.

SUMMARY

Accordingly, a need has arisen for improving power management efficiency using DC-DC switching regulators and linear regulators without substantially increasing the size and the complexity of the circuit and the number of external components used. Moreover, a need has further arisen to improve power management efficiency in a cost effective manner. It will become apparent to those skilled in the art after reading the detailed description of the present invention that the embodiments of the present invention satisfy the above mentioned needs.

In one embodiment of the present invention, a two stage power regulator is used along with control circuitry. The first stage power regulator may be a switching regulator that efficiently adjusts an input power signal to a second stage power regulator based on a feedback signal generated by the control circuitry.

The second stage power regulator may include a plurality of linear low dropout voltage regulators coupled to the switching regulator. The plurality of linear low dropout voltage regulators turn on/off and adjust power based on the number of functional units that are coupled to them. In general, the term "low dropout" refers to a variety of linear regulators that operate with a small difference between their input and output voltage.

It is appreciated that the plurality of linear low dropout voltage regulators adjust power by dissipating power and are in general more efficient when the difference between their input and the output voltage is small. It is further appreciated that the input voltage in the first stage power regulator is efficiently adjusted using the switching regulator in the second stage power regulator. Switching regulators regulate input and output power by storing energy electro-magnetically and releasing it as output voltage on demand. Thus, the input voltage to the plurality of linear low dropout voltage regulators is adjusted to be relatively close to their desired output. As a result, power dissipation at the second stage power regulator is reduced. It is further appreciated that the number of linear low dropout voltage regulators is equal to or greater than the number of switching regulators which in one example is only one. Accordingly, the efficiency of the power management unit is improved without substantially increasing the number of external components, system complexity or cost.

The control circuitry is coupled to the plurality of linear low dropout voltage regulators and receives a plurality of signals from the plurality of linear low dropout voltage regulators. According to one embodiment, the received signals represent the dissipated power by each linear low dropout voltage regulator. The feedback signal is generated in response to the received signals from the plurality of linear low dropout voltage regulators and based on the desired output voltage as well as the adjusted input voltage from the switching regulator. Thus, the generated feedback signal is sent to the switching regulator that in response to the received feedback signal adjusts the input voltage to reduce power dissipation in the second stage, thereby improving the efficiency of the power management unit.

More specifically, an embodiment of the present invention pertains to improving power efficiency of a device. A first stage power regulator is operable to adjust a received input voltage based on a feedback signal, wherein the adjustment is performed without substantial power dissipation, and wherein the first stage power regulator generates an adjusted input voltage to a second stage power regulator such that the second stage power regulator operated with reduced power dissipation. The second stage power regulator includes a plurality of low dropout regulators coupled to the first stage power regulator, wherein each of the plurality of low dropout regulators adjusts the adjusted input voltage to output a desired output voltage, wherein each of the desired output voltage is operable to control the power to a section and/or unit of the electronic device. A control circuitry, coupled to the first stage and the second stage, for generating the feedback signal based on dropout voltages of the plurality of low dropout voltages and the desired output voltage for the plurality of low dropout regulators and the adjusted input voltage.

The embodiments include the above and wherein the first stage power regulator includes at least one switching regulator. According to one embodiment, the number of switching regulators used in the first stage power regulator is less than or equal to the number of the plurality of low dropout regulators in the second stage power regulator.

The embodiments further include the above and wherein the control circuitry selects the largest dropout voltage between dropout voltages of the plurality of low dropout voltages and adds the selected dropout voltage to the desired output voltage to generate the feedback signal. Optionally the control circuitry further adds a margin voltage for compensating for process variation.

It is appreciated that in general the first stage power regulator dissipates proportionally less power in comparison to the plurality of low dropout regulators when the difference between its input and output voltage increases. In one embodiment, the low dropout regulators are coupled in a parallel configuration.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Figure 1:
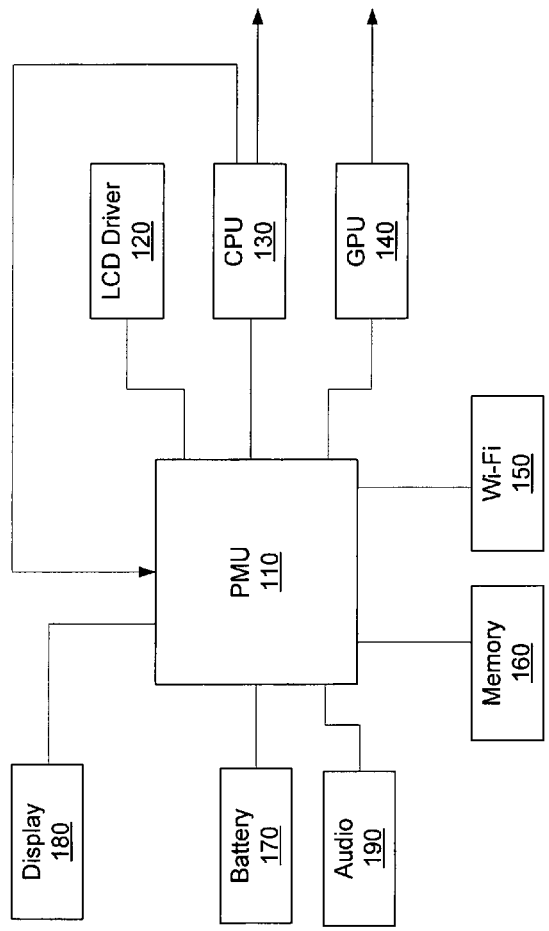
FIG. 1 shows an exemplary device with a power management unit in accordance with one embodiment of the present invention.

Improved Power Management Efficiency Using DC-DC and Linear Regulators in Conjunction Referring now to FIG. 1, an exemplary electronic device 100, e.g., a battery operated or mobile device, with a power management unit in accordance with one embodiment of the present invention is shown. In this embodiment, the device 100 includes a power management unit (PMU) 110, a display driver 120, e.g., a liquid crystal display driver, a central processing unit 130, a graphical processing unit 140, a wireless Ethernet interface (WiFi) unit 150, a memory component 160, an optional battery 170 and a display 180 and an audio interface 190. It is appreciated that the components illustrated are exemplary and are not intended to limit the scope of the present invention.

In one embodiment, the PMU 110 receives input voltage signal from the battery 170. In order to improve power efficiency, the PMU 110 selectively turns on/off the power to different units as they require power for their operations. For example, when the display 180 is not used and not needed by the GPU 140, the PMU 110 turns off the power to the LCD driver 120 and the display unit 180 in order to conserve power. Thus, the battery 170 power is conserved. Similarly, the PMU 110 turns off the power when other components, e.g., WiFi 150, GPU 140, etc. are not used. In one example, when the device 100 is used to play music, e.g., mp3 songs, the PMU 110 may turn off the power to the display 180, the LCD driver 120, the GPU 140, the WiFi 150 and the like to conserve power, thereby leaving the audio section 190 active.

It is appreciated that the PMU 110 selectively turns the power on/off to various units in a power efficient manner. It is further appreciated that the PMU 110 achieves high power efficiency using a combination of a DC-DC switching regulator and linear regulators by reducing power dissipation in the linear regulators. Moreover, the PMU 110 utilizes small, easy to implement and cost effective components to achieve high power efficiency while using relatively few external components. The functionality of the PMU 110 according to one embodiment of the present invention is further described below. It is appreciated that linear regulators and low dropout voltage regulators are used interchangeably unless specified otherwise.

Figure 2:
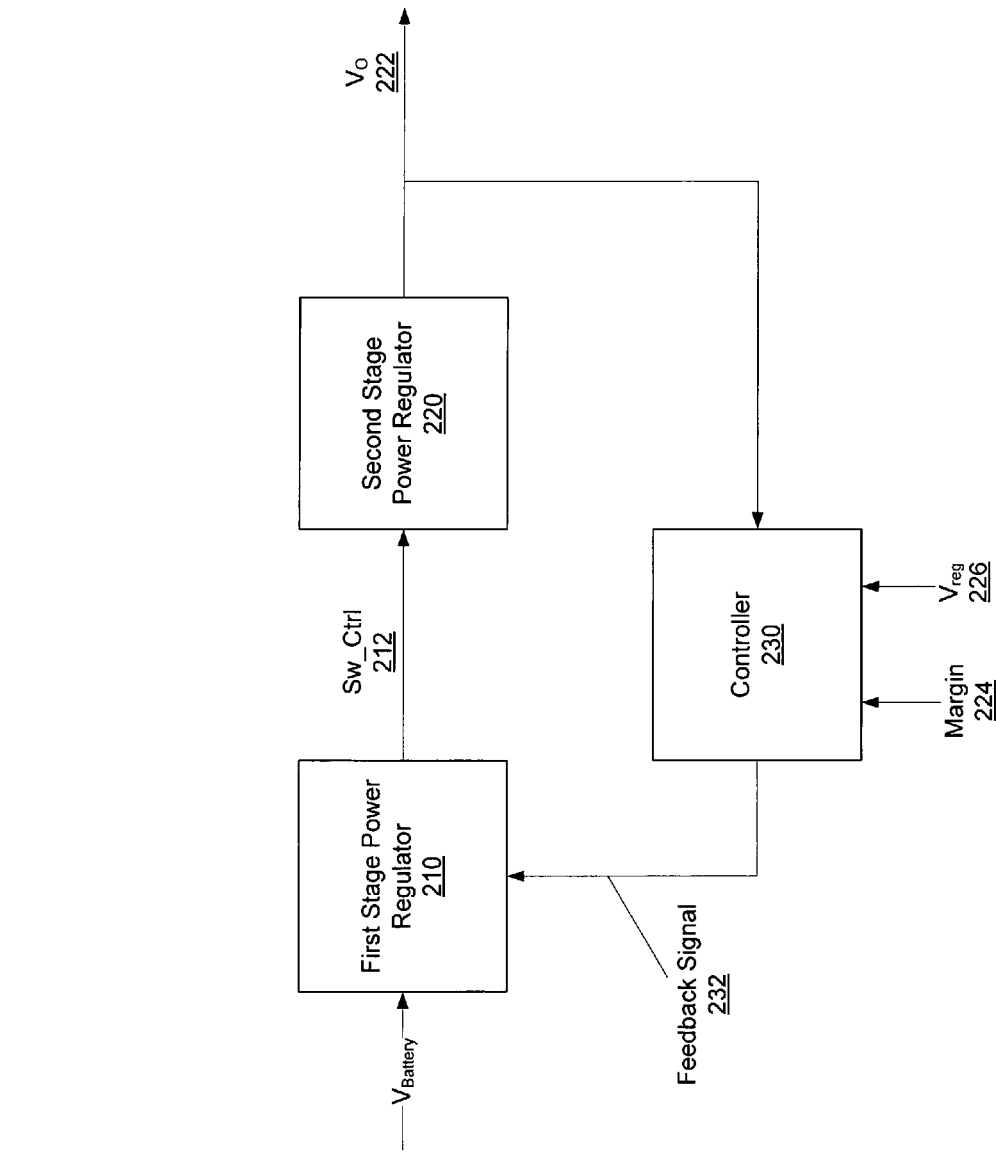
FIG. 2 shows an exemplary power management unit in accordance with one embodiment of the present invention.

Referring now to FIG. 2, an exemplary power management unit in accordance with one embodiment of the present invention is shown. The PMU 200 includes a first stage power regulator 210, a second stage power regulator 220 and a controller 230.

According to one embodiment of the present invention, the first stage power regulator 210 receives an input voltage signal that may be from a battery source. The first stage power regulator 210 adjusts the input voltage signal based on a feedback signal 232. The feedback signal 232 in one embodiment may be an indication of the power needed by the second stage power regulator 220 to efficiently turn on/off various units of the device and provide them with sufficient power to operate.

The first stage power regulator 210 uses the feedback signal 232 from the controller 230 to adjust the input voltage signal to generate the adjusted input voltage Sw_Ctrl 212. The adjusted input voltage Sw_Ctrl voltage 212 is the input voltage to the second stage power regulator 220. In one embodiment of the present invention, the first stage power regulator 210 may include at least one switching regulator. Switching regulators magnetically store energy and release energy when needed. Therefore, using at least one switching regulator in the first stage power regulator 210 facilitates adjustment of the input voltage in an efficient manner without substantially increasing the complexity, cost or the number of external components.

The feedback signal 232 may indicate the adjustment needed for the input voltage signal such that the second stage power regulator 220 selectively turns on/off power to various units of the device while reducing power dissipation in the second stage power regulator 220. Accordingly, low dropout voltage regulators, that are cost effective, easy to implement and have very few external components are used in the second stage power regulator.

Low dropout voltage regulators are efficiently used because the difference between their input and output voltages are reduced because their input voltage is efficiently adjusted by the first stage power regulator 210 to reduce their power dissipation. For example, the first stage power regulator 210, e.g., a switching regulator, efficiently adjusts the input voltage to the second stage power regulator 220 such that the second stage power regulator 220 has only a small voltage differential between its input and output voltage level. As a result, little power is dissipated and relatively simple, less costly and highly efficient power management unit can be implemented in the second stage.

The first stage power regulator 210 further outputs the adjusted input voltage signal Sw_Ctrl 212. The controller 230 generates the feedback signal 232 based on the Sw_Ctrl 212 and the desired voltage, which in one embodiment is the output voltage of the second stage power regulator $V_o$ 222. The generation of the feedback signal 232 is described below in conjunction with the control circuitry 230 in FIG. 4.

Referring still to FIG. 2, the second stage power regulator 220 receives the adjusted voltage by the first stage power regulator 210, e.g., Sw_Ctrl 212. The second stage power regulator 220 comprises a plurality of switches that turn on/off various units of the electronic device. It should be noted that the output voltage $V_o$ 222 may be a vector of output voltages. For example, the output voltage $V_o$ 222 may include output voltages $V_{O1}$, $V_{O2}$, etc. wherein each output voltage is to drive a given unit of the electronic device, e.g., the display 180, the LCD driver 120, the CPU 130, the GPU 140, the WiFi 150, the memory 160, and the like. As a result, the units that are not used are turned off and other units are supplied with sufficient voltage to operate.

Referring still to FIG. 2, the controller 230 receives the output $V_o$ 222 from the second stage power regulator 220. The controller 230 based on the received output $V_o$ 222 determines the power dissipation for each low dropout regulator that corresponds to a given unit, e.g., power dissipation for the display 180, the LCD driver 120, etc. Based on the power dissipation, and the desired output voltage, e.g., $V_{reg}$ 226, and the adjusted input signal Sw_Ctrl 212, the controller 230 generates the feedback signal 232. The feedback signal 232 causes the first stage power regulator 210 to adjust the input voltage at 212 to match closer to the voltage at 222 such that power dissipation in the second stage power regulator 220 is reduced. It is appreciated that in one embodiment, the controller 230 may further compensate for voltage variation in the system by considering an offset voltage, e.g., the margin 224 voltage. The generation of the feedback signal 232 is described below in conjunction with FIG. 4.

Figure 3:
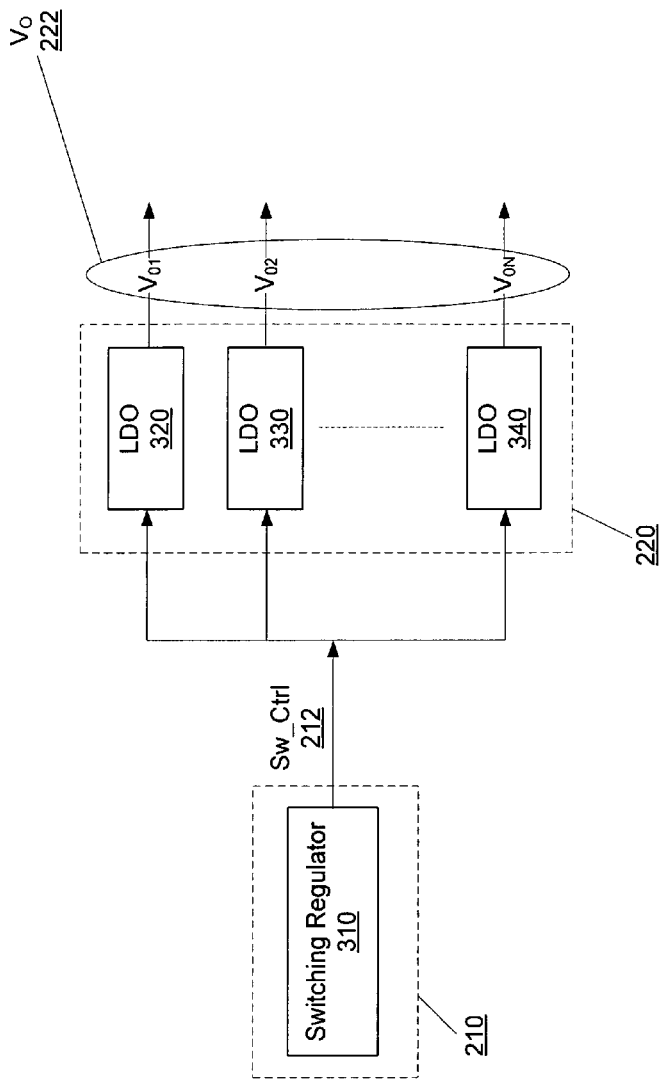
FIG. 3 shows an exemplary first stage power regulator and second stage power regulator for managing power in a device in accordance with one embodiment of the present invention.

Referring now to FIG. 3, an exemplary first stage power regulator and an exemplary second stage power regulator for managing power in a device in accordance with one embodiment of the present invention is shown. As described above, the first stage power regulator 210 may comprise at least one switching regulator 310. Furthermore, as described above the second stage power regulator 220 may comprise a plurality of low dropout regulators 320, 330 and 340.

According to one embodiment of the present invention, the second stage power regulator 220 includes a plurality of low dropout regulators. In general, low dropout voltage regulators are small, easy to implement, and use very little external components. Low dropout voltage regulators regulate voltage by dissipating power. Thus, low dropout voltage regulators become highly inefficient when the difference between their input voltage and output is large. Therefore, it is the task of the switching regulator 310 to provide a voltage at 212 that is relatively close to the output voltages, $V_{O1}$ thru $V_{ON}$ (222).

It is appreciated that the number of low dropout regulators used may vary depending on design requirements. However, as described above it is appreciated that there is at least one switching regulator 310 that may support a number of low dropout regulators.

In one exemplary embodiment, the power dissipation in the second stage power regulator 220 is reduced by adjusting its input voltage such that the difference between the input and output voltage of the second stage power regulator 220 is made small. Thus, power dissipation in the second stage regulator decreases. The input voltage to the second stage power regulator 220 is adjusted by a highly efficient switching regulator in the first stage power regulator 210. Thus, the difference between the input and output voltage of the second stage power regulator 220 is made small without substantially increasing complexity, cost or the number of external components in the overall system. Thus, voltage regulation efficiently regulates and switches various units of the electronic device.

Accordingly to one embodiment, each low dropout regulator receives the adjusted input voltage Sw_Ctrl 212 from the first stage power regulator 210. Upon receiving the adjusted input voltage Sw_Ctrl 212, each low dropout voltage supplies a voltage signal for its corresponding unit. Power may also be turned on/off separately. For example, when the electronic device is used as an mp3 player, the power to the WiFi 150, the display 180 and the LCD driver 120 may be turned off. Thus, batter power is conserved.

The second stage power regulator 220 outputs voltage to various units of the electronic device separately. For example, the output signal $V_{O1}$ may be the voltage signal that controls the display unit. Similarly, the output signal $V_{O2}$ may be the voltage signal that controls the LCD driver, etc.

It is appreciated that the number of low dropout regulators of the second stage per switching regulator of the first stage may vary depending on the design. It is appreciated that in one embodiment, the number of low dropout regulators in the second stage power regulator 220 is more than the number of switching regulators in the first stage power regulator 210. For example, one switching regulator in the first stage power regulator 210 may be used for a number of low dropout regulators in the second stage power regulator 220. Accordingly, the low dropout regulators achieve high efficiency because the switching regulator adjusts the input of the low dropout regulators close to the output of low dropout regulators. Thus, power dissipation in the second stage power regulator 220 is reduced. Furthermore, using one switching regulator for a number of low dropout regulators reduces the number of external components and further reduces the complexity and the cost of the power management unit while increasing the efficiency in the second stage power regulator 220.

Figure 4:
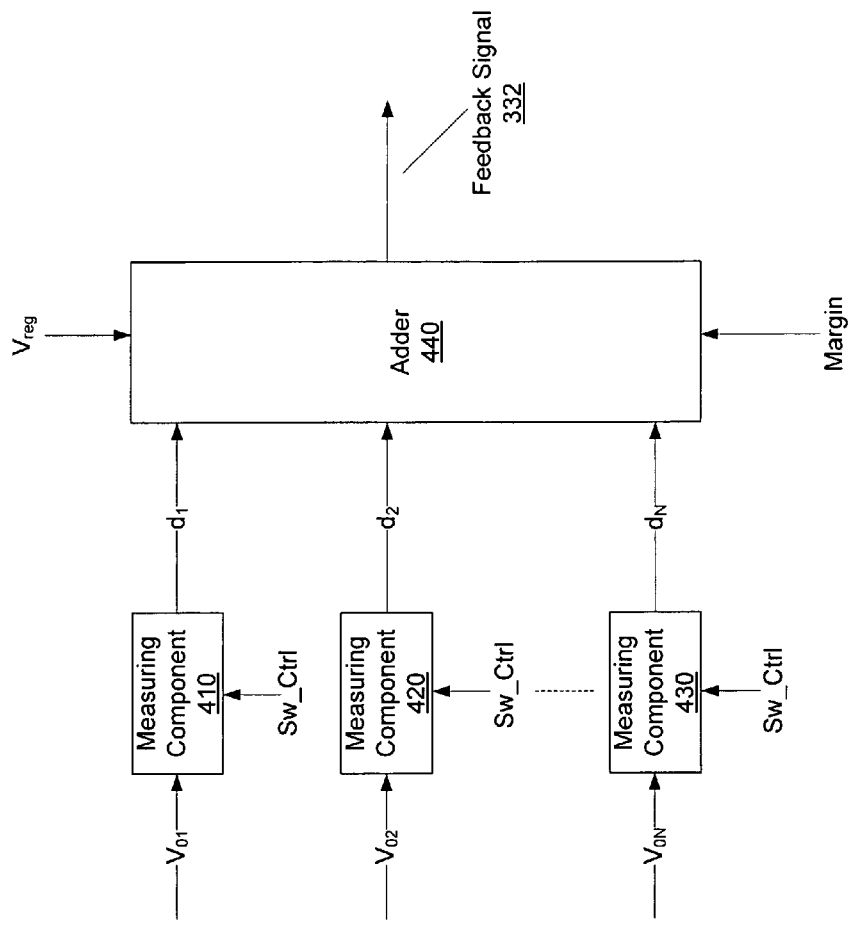
FIG. 4 shows an exemplary control circuitry in accordance with one embodiment of the present invention.

Referring now to FIG. 4, an exemplary control circuitry 230 in accordance with one embodiment of the present invention is shown. The control circuitry 230 may include a plurality of measuring components, e.g., measuring component 410, measuring component 420 and measuring component 430. The control circuitry 230 may further include an adder 440.

As discussed above, the control circuitry 230 receives the output signals from the second stage power regulator 220 and generates the feedback signal 332. It is appreciated that each output signal, e.g., $V_{O1}$, $V_{O2}$, $V_{ON}$, etc., are the voltage supply signal provided to the units within the device, e.g., display 180, memory 160, WiFi 150, GPU 140, CPU 130, LCD driver 120, etc.

According to one embodiment, the dropout voltage for each low dropout voltage regulator, e.g., LDO 320, LDO 330, LDO 340, etc. is measured by a respective measuring component. For example, the measuring component 410 measures the dropout voltage of LDO 320. In one embodiment, the dropout voltage d1 is measured by comparing the actual output voltage $V_{O1}$ from LDO 320 to the adjusted input signal Sw_Ctrl 212 of the switching regulator. In one exemplary embodiment, the comparison may be done by measuring the output current from the LDO 320 and by measuring the error signal between $V_{O1}$ and Sw_Ctrl 212. In one exemplary embodiment, a headroom requirement that is a constant may also be considered in addition to the dropout voltage. The dropout voltage is difference between the input and the output voltage represented as $d_1$ for LDO 320. The dropout voltage $d_1$ is sent to the adder 440.

Similarly, the required dropout voltage for each low dropout voltage regulator may be measured. For example, the measuring component 420 may be used to measure the dropout voltage $d_2$ for LDO 330 and the measuring component 430 may be used to measure the dropout voltage $d_N$ for LDO 340. Similar to dropout voltage d1, each measured dropout voltage, e.g., $d_2$, $d_N$, etc. is sent to the adder 440.

Referring still to FIG. 4, the adder 440 receives the plurality of dropout voltages, hence dropout voltage requirements, e.g., $d_1$, $d_2$, $d_N$, etc. Furthermore, the adder 440 may receive the desired output signal $V_{reg}$. The desired output signal $V_{reg}$ represents the desired signal for each functional unit, e.g., display 180, to properly operate. The adder 440 generates the feedback signal 332 which represents an adjustment to the input voltage to the first stage power regulator 210, e.g., $V_{Battery}$, such that the input to each LDO in the second stage power regulator 220 is close to its desired output, thereby reducing power dissipation of the plurality of low dropout voltage regulators.

According to one embodiment, the adder 440 may further include a comparator (not shown). The adder 440 may select the largest dropout voltage, hence determines the largest dropout voltage requirement between all the low dropout voltage regulators. By selecting the largest dropout voltage requirement, all of the dropout voltage regulators will be satisfied and operational. The adder 440 may then add the largest dropout voltage requirement to the desired output voltage $V_{reg}$ to generate the feedback signal 332. The feedback signal 332 indicates the amount of adjustment needed to the input power $V_{battery}$ in the first stage power regulator 210 to reduce power dissipation in the second stage power regulator 220. In other words, feedback=max $(d_1, d_2, \ldots, d_N)$+ $V_{reg}$+margin.

It is appreciated that in one embodiment voltage variation in the system may also be considered in generating the feedback signal 332. For example, an offset signal, e.g., Margin, may be further added to the feedback signal 332 in order to take into account and compensate for voltage variation in the system. The voltage variation may be due process variation and the like.

Figure 5:
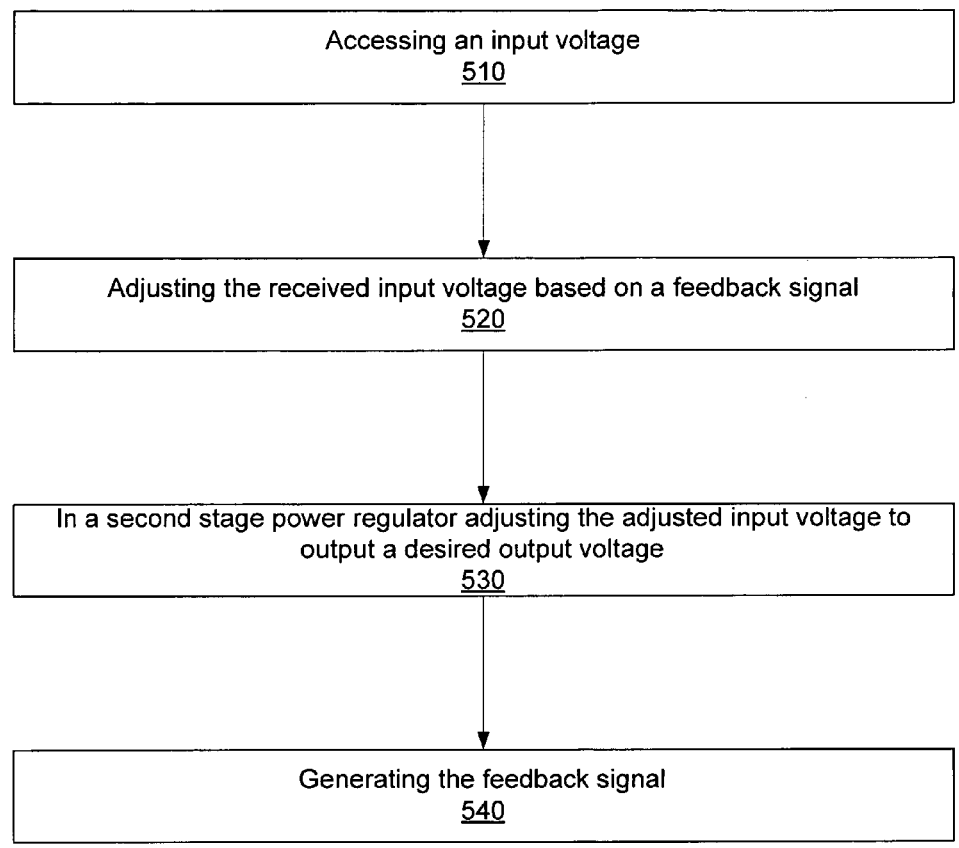
FIG. 5 shows an exemplary flow diagram for managing power in a device in accordance with one embodiment of the present invention.

Referring now to FIG. 5, an exemplary flow diagram 500 for managing power in a device in accordance with one embodiment of the present invention is shown. At step 510, the input voltage signal is accessed. As discussed above, the input voltage may be a battery power and it may be received by the first stage power regulator.

It is appreciated that the first stage power regulator also receives a feedback signal. Thus, at step 520, the first stage power regulator adjusts the input voltage, e.g., battery power, based on the feedback signal. It is further appreciated that the adjustment in the first stage power regulator is highly power efficient even when the difference between the input and output voltage increases. In one example, a switching regulator may be used in the first stage power regulator that magnetically stores the energy and releases energy on demand. It is also appreciated that changing the input signal based on the feedback signal adjusts the input signal to the second stage power regulator such that power dissipation in the second stage power regulator is reduced.

At step 530, the second stage power regulator receives the adjusted voltage signal by the first power regulator and adjusts the received signal for outputting the desired voltage signal to the functional units of the device. The second stage power regulator may include a plurality of low dropout voltage regulators. The output of the second stage power regulator controls the operation of various units in the device, e.g., display 180. For example, when a music player application is used and when the music file is not being accessed over the Wi-Fi network, a low dropout voltage regulator corresponding to a WiFi 150 may be turned off in order to conserve battery power.

It is appreciated that even though low dropout voltage regulators are inefficient when the difference between the input and the output voltage increases, that inefficiency does not adversely affect the system because the input voltage of the low dropout voltage regulators is adjusted to be close to their output voltage, thereby reducing the power dissipation. As a result, small internal components that are easy to implement are used to improve the power efficiency of the system. It is appreciated that the number of low dropout voltage regulators is larger than the number of switching regulators. In other words, there are a number of low dropout voltage regulators for each switching regulator. It is further appreciated that the plurality of low dropout voltage regulators may be assembled in a parallel configuration. It is appreciated that in one embodiment, linear regulators may be designed such that they are operable for low input/output difference in order to reduce component size as well as the reducing the power handling capacity of components needed for designing the linear regulators.

At step 540, in response to the desired output signal from the plurality of low dropout voltage regulators as well as the adjusted input voltage, the feedback signal is generated. The generation of the feedback signal is described in conjunction with FIG. 6.

Figure 6:
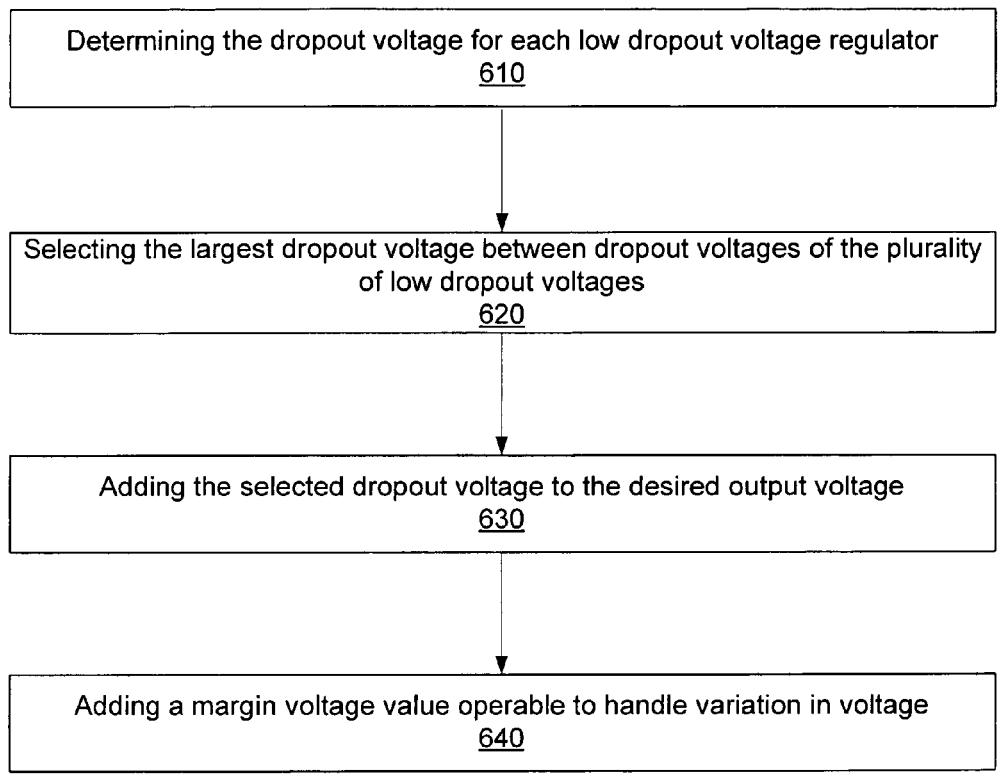
FIG. 6 shows an exemplary flow diagram for generating the feedback signal in accordance with one embodiment of the present invention.

Referring now to FIG. 6, an exemplary flow diagram 600 for generating the feedback signal in accordance with one embodiment of the present invention is shown. At step 610, the dropout voltage requirement for each low dropout voltage regulator is determined. The dropout voltage requirement is the dropout voltage for each of the low dropout voltage regulator. At step 620, the largest dropout voltage requirement is determined and selected. Selection of the largest dropout voltage requirement guarantees satisfaction of dropout voltage requirement by all of the low dropout voltage regulators. At step 630, the selected dropout voltage, e.g., the required dropout voltage, is added to the desired output voltage to generate the feedback signal. In one embodiment, at step 640, a margin voltage value may also be added to generate the feedback signal to compensate for voltage variation in the system.

As a result, efficiency of a power management unit is improved without substantially increasing the complexity of the circuit or increasing the number of external components. Moreover, the efficiency of the power management unit is improved in a cost effective manner by using a multiple low dropout voltage regulators for each switching regulator.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A power management unit for improving power efficiency of electronic device comprising:
    a first stage power regulator operable to adjust an input voltage based on a feedback signal, wherein said first stage power regulator generates an adjusted input voltage supplied to a second stage power regulator;
    said second stage power regulator comprising a plurality of low dropout regulators, wherein each of said plurality of low dropout regulators adjusts said adjusted input voltage to output a desired output voltage, wherein one low dropout regulator is operable to selectively power down a first respective section of said electronic device associated therewith while a second low dropout regulator is operable to selectively power down a second respective section of said electronic device associated therewith contemporaneously; and
    a control circuitry for generating said feedback signal, wherein said control circuitry determines a largest dropout voltage of said plurality of low dropout regulators and in response to said determining, said control circuitry generates said feedback signal, wherein said feedback signal is based on a respective power dissipation of each of said plurality of low dropout regulators.

2. The power management unit as described in claim 1, wherein said first stage power regulator comprises at least one switching regulator.

3. The power management unit as described in claim 2, wherein the number of switching regulators used in said first stage power regulator is less than or equal to the number of said plurality of low dropout regulators in said second stage power regulator.

4. The power management unit as described in claim 1, wherein said control circuitry adds said largest dropout voltage to said desired output voltage to generate said feedback signal.

5. The power management unit as described in claim 4, wherein said control circuitry further adds a margin voltage to said feedback signal for compensating process variation.

6. The power management unit as described in claim 1, wherein said first stage power regulator dissipates less power in comparison to said plurality of low dropout regulators when the difference between the input and output voltage increases.

7. The power management unit as described in claim 1, wherein said plurality of low dropout regulators is coupled in a parallel configuration.

8. An electronic device comprising:
    a battery operable to supply an input voltage;
    a power management unit comprising:
    a first stage power regulator operable to adjust said input voltage based on a feedback signal, wherein said first stage power regulator generates an adjusted input voltage for a second stage power regulator such that said second stage power regulator operates with reduced power dissipation;
    said second stage power regulator comprising a plurality of low dropout regulators coupled to said first stage power regulator, wherein each of said plurality of low dropout regulators adjusts said adjusted input voltage to output a desired output voltage, wherein each desired output voltage controls power to a respective section of said electronic device, wherein one low dropout regulator is operable to selectively power down a first respective section of said electronic device associated therewith while a second low dropout regulator is operable to selectively power down a second respective section of said electronic device associated therewith contemporaneously; and
    a control circuitry, coupled to said first stage power regulator and said second stage power regulator, for generating said feedback signal based on dropout voltages of said plurality of low dropout voltages and said desired output voltage for said plurality of low dropout regulators, wherein said control circuitry determines a largest dropout voltage of said plurality of low dropout regulators and in response to said determining, said control circuitry generates said feedback signal, wherein said feedback signal is based on a respective power dissipation of each of said plurality of low dropout regulators; and
    a processor operable to process data.

9. The device as described in claim 8, wherein said first stage power regulator comprises at least one switching regulator.

10. The device as described in claim 9, wherein the number of switching regulators used in said first stage power regulator is less than or equal to the number of said plurality of low dropout regulators in said second stage power regulator.

11. The device as described in claim 8, wherein said control circuitry adds said largest dropout voltage to the desired output voltage to generate said feedback signal.

12. The device as described in claim 11, wherein said control circuitry further adds a margin voltage to said feedback signal for compensating process variation.

13. The device as described in claim 8, wherein said first stage power regulator dissipates less power in comparison to said plurality of low dropout regulators when the difference between the input and output voltage increases.

14. The device as described in claim 8, wherein said plurality of low dropout regulators is coupled in a parallel configuration.

15. A method of managing power in an electronic device, said method comprising:
- accessing an input voltage;
- in a first stage power regulator, adjusting said received input voltage based on a feedback signal, wherein said first stage power regulator generates an adjusted input voltage for a second stage power regulator such that said second stage power regulator operates with reduced power dissipation;
- in said second stage power regulator comprising a plurality of low dropout regulators, each of said plurality of low dropout regulators adjusting said adjusted input voltage to output a desired output voltage, wherein each of said desired output voltage controls power to a respective section of said electronic device, wherein one low dropout regulator is operable to selectively power down a first respective section of said electronic device associated therewith while a second low dropout regulator is operable to selectively power down a second respective section of said electronic device associated therewith contemporaneously; and
- in a control circuitry, determining a largest dropout voltage of said plurality of low dropout regulators and in response to said determining, generating said feedback signal, wherein said feedback signal is based on a respective power dissipation of each of said plurality of low dropout regulators.

16. The method as described in claim 15, wherein said first stage power regulator comprises at least one switching regulator.

17. The method as described in claim 16, wherein the number of switching regulators used in said first stage power regulator is less than or equal to the number of said plurality of low dropout regulators in said second stage power regulator.

18. The method as described in claim 16 wherein said plurality of low dropout regulators is coupled in a parallel configuration.

19. The method as described in claim 15 further comprising:
- adding said largest dropout voltage to the desired output voltage to generate said feedback signal.

20. The method as described in claim 19 further comprising:
- adding a margin voltage value to said feedback signal operable to handle variation in voltage.

21. The method as described in claim 15, wherein said first stage power regulator dissipates less power in comparison to said plurality of low dropout regulators when the difference between the input and output voltage increases.

22. The method as described in claim 20, wherein said margin voltage value is for compensating for variation in voltage due to process variation.

23. The power management unit as described in claim 1, wherein said second stage power regulator is coupled to said first stage power regulator and wherein each of said desired output voltage controls power to a respective section of said electronic device, and wherein said control circuitry is coupled to said first stage power regulator and said second stage power regulator and wherein said feedback signal is based on measured dropout voltages of said plurality of low dropout voltages for said plurality of low dropout regulators and said desired output voltage of said plurality of low dropout regulators.

* * * * *